Dec. 6, 1932.  H. J. DE N. McCOLLUM ET AL  1,890,398
CLUTCH CONTROLLING MECHANISM
Original Filed Dec. 20, 1930
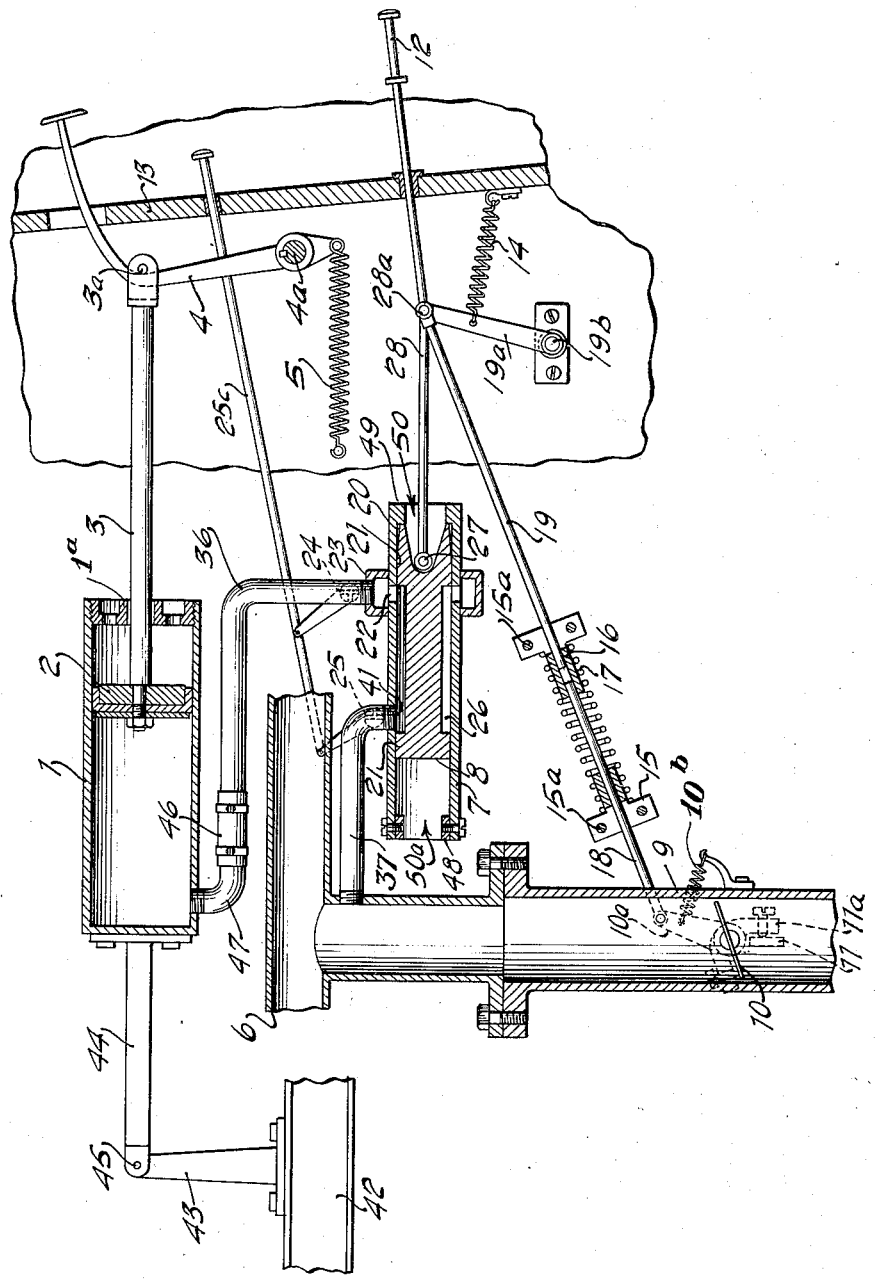
INVENTOR
Henry J. De N. McCollum.
James H. K. McCollum.
BY
ATTORNEY Patented Dec. 6, 1932

1,890,398

UNITED STATES PATENT OFFICE

HENRY J. DE N. McCOLLUM AND JAMES H. K. McCOLLUM, OF LONG BRANCH, NEW JERSEY

CLUTCH CONTROLLING MECHANISM

Original application filed December 20, 1930, Serial No. 503,767. Divided and this application filed May 7, 1932. Serial No. 609,802.

The invention herein set forth relates to pneumatically operated mechanism for actuating the clutches of motor cars and comprises valve means for controlling such mechanism.

In the most commonly used form of apparatus for actuating motor car clutches automatically the power is supplied by a vacuum cylinder which contains a piston connected to the clutch lever, said piston being reciprocated as the cylinder is alternately connected to the intake manifold of the motor, or disconnected therefrom and opened to the atmosphere so that air may flow into said cylinder behind the piston as the clutch springs pull the clutch lever into such closing position, the other end of said cylinder being open to the atmosphere to permit such piston movement. Part of the mechanism here shown comprises means for controlling and graduating such inflow of air and thereby controlling the speed of the clutch closing movement of the clutch lever. This controlling means includes a valve apparatus comprising a casing having a port connected to said vacuum cylinder and a valve piston having a sliding fit in said casing along at least one section of its length, and also having another and relatively considerable section of its length provided with a surface portion slightly inclined inwardly and away from said first-mentioned section, so as to produce a gradually reduced cross-section of said valve piston adapted to cooperate with said port during a portion of the valve travel, and so regulate the rate of air inflow to the cylinder. The cylinder and piston may be replaced by a flexible diaphragm set in an airtight container or by any other form of fluid pressure motor.

The apparatus here shown and described is the same as that shown in Fig. 1 of our Patent No. 1,858,999 granted May 17, 1932, on our application Serial No. 503,767, filed December 20, 1930, of which this application is a division. The claims of our said issued patent are however, confined to that one of the two forms of apparatus there shown in which the pneumatic cylinder is closed at both ends, and the clutch closing movement of the clutch lever is controlled by controlling the outflow of air from that end of the cylinder towards which the piston then moves, as illustrated in Fig. 5 of said patent. In the present application we claim only the alternative form of apparatus, hereinbefore outlined, in which the piston rod extends through an open end of the cylinder, and the movement of the piston toward that end in the clutch closing movement is controlled by controlling the inflow of air to the cylinder space behind the piston. The same type of valve is shown in both cases, it serving to graduate the outflow of air in one case and the inflow of air in the other.

The accompanying drawing is a diagrammatic illustration of one form of pneumatic clutch actuating apparatus with our invention applied thereto, parts being shown in section and others broken away.

1 is a vacuum cylinder having a closed end from which extends arm 44 by which it is hinged at 45 on bracket 43 supported from beam 42, which latter may be a part of the chassis of a motor car. 2 is a piston in cylinder 1 having a cup-leather packing which prevents air passing around it into the cylinder space behind it, but allows air to pass out slowly around it, and 3 is a piston rod extending through the other cylinder end 1a but not having an airtight bearing therein. The outer end of said piston rod is pivotally connected at 3a to the clutch lever 4 mounted on rotatable shaft 4a and normally pulled toward clutch engaging, or closing, position by a spring such as 5 in the usual way. 6 represents generally the intake manifold of an internal combustion motor to which the carburetor mixture tube 9 is connected.

The closed end of the cylinder 1 is connected by conduit 36 to a port casing 23 which surrounds the casing 7 of the fluid pressure controlling valve and communicates with a plurality of ports 22 in said casing. 37 is a conduit connecting the intake manifold 6 with said valve casing 7 at another point through port 41. The piston valve 8 has a medial portion 26 of reduced diameter which is long enough to bridge ports 22 and 41 when the accelerator pedal 12 is retracted so that said valve remains in the position shown.

The piston valve 8 has its right hand portion or extremity tapered slightly, as indicated at 20, while the remainder of that end and its left hand section are left in full bodied shape, as shown at 21, 21. Said valve is connected by wrist pin 27 to link 28 by which it may be slid endwise in its casing, either manually or by means of some automatic mechanism such as shown. Both ends of valve casing 7 are preferably left open to the atmosphere, as shown, such openings being marked 50 and 50a respectively. The use of the two openings balances the valve, but the right hand opening 50 would suffice so far as the admission of air to the ports 22 is concerned. Preferably the ends of the valve casing are provided with stops 48 and 49 for limiting the movement of the valve member 8. The inwardly sloping surface portion 20 of the valve member preferably extends toward the adjacent opening to the atmosphere 50 in the valve casing a distance from its adjacent full bodied section 21 which is at least equal to the width of ports 22.

The automatic mechanism shown for moving valve member 8 comprises a connection to the accelerator pedal 12, which pedal, of course, also operates the carburetor throttle through a lost motion connection, as shown, 10 being the carburetor throttle valve controlled by lever 10a and spring 10b, which latter normally holds one extremity of the valve arms 11a against fixed stop 11, the throttle then being in adjusted position for idling the motor.

The lost motion apparatus shown is composed of the two-part connecting rod, sections 18 and 19 of which are held in line one with another by tubular clip 16 which is fast on rod section 19. A similar clip 15 is fastened on rod section 18, and compression spring 17 is confined between these clips. The enlarged ends of these clips may be split so that they can be clamped down, each on its supporting rod section, by set screws 15a. The other end of this connecting rod is pivoted at 28a to swinging link 19a mounted on a fixed pivot 19b, and also to the accelerator plunger 12 which extends through the footboard 13. A tension spring 14 normally holds the accelerator plunger and pedal on the end thereof in retracted position, as shown, with a gap existing between the adjacent ends of the rod sections 18 and 19, which gap determines the amplitude of the lost motion.

1a indicates a skeleton cylinder head serving as a guide for piston rod 3, and the piston 2 is there shown as having just begun its travel to the left to open the clutch.

The operation of the mechanism shown and so far described is as follows:

With the parts in the positions shown, the manifold 6 is connected by means of conduit 37, ports 41 and 22, annular space around the valve portion 26 of reduced diameter and the pipe 36, to the vacuum cylinder 1, so that piston 2, piston rod 3 and clutch pedal 4 are moved into and held in the clutch disengaging position, the motor vehicle then being permitted to coast or free wheel. When, however, valve member 8 is pushed to the left, either by hand or by pressure on accelerator pedal 12, the ports 22 will first be cut off from communication with port 41 and the intake manifold, and later, as the valve moves farther in that direction, said ports 22 will be gradually open to the atmosphere, as the inclined surface portion 20 of the valve comes opposite them, so that air can flow through them and conduit 36 back to cylinder 1 in graduated volumes as the clutch springs pull lever 4 in a clockwise direction and piston 2 toward the right hand open end of cylinder 1 to close the clutch. Further movement of pedal 12 will open the ports 22 to the full extent and also open the throttle valve of the carburetor, the lost motion in connection 18—19 having been taken up by that time.

Various changes could be made in the details of the constructions here shown without departing from the underlying principles of the invention. The cut-out valves 24 and 25 in conduits 36 and 37 are opened and closed simultaneously by rod 25c, for the purpose explained in our before-mentioned Patent 1,858,999.

Having described our invention, we claim:

1. In a power producing apparatus for actuating the clutch of a motor car comprising a vacuum operated device connected to the clutch lever and a conduit connecting said device with the intake manifold of the car motor, the combination, with said above described apparatus, of a valve mechanism for controlling the passage of air through said conduit which comprises a tubular casing having a port adapted to communicate with one section of such conduit, a second port adapted to communicate with another section of such conduit and an opening to the atmosphere spaced away from said ports, together with a movable valve member adapted to slide in said casing having a full bodied section filling said casing and a portion provided with an inwardly inclined surface sloping slightly inwardly from said full bodied section and toward said opening to the atmosphere, said sloping surface portion extending a distance from said full bodied section at least substantially equal to the width of the port with which it is adapted to cooperate; whereby, when said valve member is moved in said casing away from said opening to the atmosphere toward and opposite to said cooperating port, its portion having said inclined surface permits air to flow through said port to or from said opening to the atmosphere in varying quantities per unit of time.

2. In a pneumatic apparatus for actuating the clutch lever of a motor car the combination, with such clutch lever, of a cylinder having one end closed and the other end communicating with the atmosphere, a piston in said cylinder having a piston rod extending through said cylinder's open end and connected to said lever, a conduit communicating with the interior of the closed end of the cylinder, and a valve apparatus controlling passage through said conduit comprising a valve casing having a port to which said conduit is connected and a valve piston having a sliding fit in said casing throughout one section of its length and also having a relatively considerable section of its length provided with a surface slightly inclined inwardly from said first mentioned section so as to produce a gradually reduced cross section of said valve piston adapted to cooperate with said port during a portion of the valve piston travel; whereby the flow of air to said closed end of the cylinder may be regulated by adjustment of such valve piston with reference to said port.

3. An apparatus such as recited in claim 2 combined with a carburetor for the motor of said car having a throttle valve, means for yieldingly holding said throttle in idling position, and mechanism for further opening said throttle which is also adapted to actuate said first mentioned valve apparatus before said throttle is further opened and after it has been closed to idling position.

4. In a pneumatically operated clutch actuating apparatus comprising a movable clutch control member, a spring tending to move said member in a direction to close the clutch and a pneumatic motor device tending to move said member in a clutch opening direction when air is exhausted therefrom, the combination with said above-described apparatus of a valve controlling the admission of air to the interior of said pneumatic device comprising a valve casing having a port to which said device is connected and a valve piston having a sliding fit in said casing throughout at least one section of its length, and also having a relatively considerable section of its length provided with a surface portion slightly inclined inwardly and away from said first-mentioned section so as to produce a gradually reduced cross section of said valve piston adapted to cooperate with said port during a portion of the valve piston travel; whereby the flow of air to the interior of said pneumatic motor device may be regulated by adjustment of such valve piston with reference to said port.

Signed at Long Branch in the county of Monmouth and State of New Jersey this 3rd day of May A. D. 1932.

HENRY J. DE N. McCOLLUM.
JAMES H. K. McCOLLUM.